United States Patent [19]

Mercier et al.

[11] 4,323,948
[45] Apr. 6, 1982

[54] CAPACITOR STRUCTURES WITH IMPROVED ELECTRICAL STRESS CAPABILITY

[75] Inventors: George E. Mercier; John H. Pickett, both of Bloomington; Barry L. Holtzman, Ellettsville, all of Ind.

[73] Assignee: Westinghouse Electric Corp., Pittsburgh, Pa.

[21] Appl. No.: 143,202

[22] Filed: Apr. 24, 1980

Related U.S. Application Data

[63] Continuation of Ser. No. 857,479, Dec. 5, 1977, abandoned.

[51] Int. Cl.³ .............................................. H01G 4/22
[52] U.S. Cl. .................................... 361/315; 361/303; 361/313
[58] Field of Search ............... 361/314, 315, 323, 303, 361/313

[56] References Cited

U.S. PATENT DOCUMENTS

| | | | |
|---|---|---|---|
| 3,048,750 | 8/1962 | Netherwood | 361/313 |
| 3,450,968 | 6/1969 | Cox | 361/314 X |
| 3,737,961 | 6/1973 | Lapp | 361/314 X |
| 3,857,073 | 12/1974 | Yagitani | 361/314 |
| 4,054,937 | 10/1977 | Mandezcorn | 361/315 |

FOREIGN PATENT DOCUMENTS 51-145556 11/1976 Japan.

*Primary Examiner*—Elliot A. Goldberg
*Attorney, Agent, or Firm*—G.H. Telfer

[57] ABSTRACT

Power capacitors with a wide electrode and a narrow electrode and a composite dielectric including a first portion adjacent the narrower electrode that is of higher dielectric constant and/or lower resistivity than the portion adjacent the wider electrode. The first portion may be a porous material whose impregnation with a suitably chosen dielectric fluid results in the desired electrical properties. In such structures the narrower electrode preferably has rounded and smooth edges such as by folding. The wide and narrow electrodes may each comprise one of the externally connected capacitor electrodes. Alternatively, the wider electrode may be electrically floating and arranged between dielectrics and a second narrower electrode in a symmetrical arrangement with the two narrower electrodes serving as the externally connected capacitor electrodes.

11 Claims, 8 Drawing Figures

DIELECTRIC: PAPER(P), FILM(F), OR COMPOSITES

HIGHER DIELECTRIC CONSTANT AND/OR LOWER RESISTIVITY
LOWER DIELECTRIC CONSTANT AND/OR HIGHER RESISTIVITY

FLOATING CONDUCTOR

FLOATING CONDUCTOR

CAPACITOR STRUCTURES WITH IMPROVED ELECTRICAL STRESS CAPABILITY

This is a continuation of application Ser. No. 857,479, filed Dec. 5, 1977, now abandoned.

BACKGROUND OF THE INVENTION

This invention relates generally to capacitors and, more particularly, to power capacitors with improved electrical stress capability.

It has been the widespread commercial practice to use aluminum foil electrodes of equal widths in high voltage capacitors used for AC power factor correction or DC applications such as energy storage and discharge or filtering. Because of width tolerances in rolls of aluminum foil and manufacturing tolerances in winding the aluminum foil electrodes, with dielectric spacers, into a convolute capacitor section, the foil electrode edges are not perfectly aligned from one end to the other. It is not considered practical to exercise the degree of care that would be necessary to assure perfect alignment. This results in an electrode system in which the foil edges are offset to some extent. Normally at one edge of the capacitor a first foil extends laterally outward less far than the second foil. At the other side of the capacitor the second foil extends laterally outward less far than the first. In operation, the voltage stress is relatively high at the edge of the recessed foil. Thus, there are points of relatively high stress at each edge of the capacitor. The higher voltage stress results in lower breakdown voltage and lower partial discharge inception voltage than would be achieved if the foils were perfectly aligned.

Two significant developments in power capacitor structures are those disclosed in Yagitani U.S. Pat. No. 3,857,073, Dec. 24, 1974, and Yagitani et al. published Japanese Patent Applications 28516/74 and 34141/74, both of Mar. 11, 1974. The subject matter of said Japanese published applications is included in U.S. application Ser. No. 724,195 filed Sept. 17, 1976, assigned to Kabushiki Kaisha Shizuki Denki Seisakusho, now abandoned. Said published Japanese applications were laid open on Sept. 25, 1975.

In the Yagitani U.S. patent is disclosed a capacitor comprising a layer of capacitor grade paper and a layer of film, particularly polypropylene, as a composite dielectric between two electrode foils of which the foil immediately adjacent the paper is narrower at both edges than the foil immediately adjacent the film. Such structures, impregnated with a dielectric fluid, have been found to compare very favorably in over-voltage tests with otherwise like capacitor structures in which the foil electrodes are like dimensioned and intended to be aligned but subject to normal manufacturing variance from perfect alignment. The virtue of this arrangement is that the narrower electrode is next to the paper layer at both edges which eases the stress problem compared with the case where the electrodes are of the same width and intended to be aligned, but not actually aligned due to manufacturing variances.

In the pending application of Yagatani et al. a further improved electrode foil arrangement is disclosed. Namely, one in which one foil is not only offset from the other at each of its edges, but that narrower foil also has its edge made rounded and smooth such as by folding over the lateral extreme portions of the foil. It is found improvement in over-voltage characteristics results as compared to otherwise like capacitors in which the narrower foil has straight cut edges.

Capacitor dielectrics include various capacitor grade papers and various synthetic plastics in the form of films of polymeric hydrocarbon materials predominantly including members of the polyolefin family of which polypropylene is most widely used in power capacitors. All paper, all film, and combinations of paper and film have been used. As a dielectric liquid impregnant, polychlorinated biphenyls (PCB's) have been most commonly used. Such fluids are today being discontinued because they are considered to be environmental pollutants. Various alternate fluids are now being used and others are under consideration. Some of these appear promising as general replacements for PCB's. However, their electrical properties are not identical to PCB's and the extent of their use and testing has been so limited as compared with that of PCB's that complete assurance of satisfactory performance over the long term is not conclusively available. Therefore, capacitor designers and manufacturers are faced with a basic change in one element, the dielectric liquid, in a tried and proven system which poses a desire for further improvements in other aspects of capacitor design such as can provide the greatest margin for safe, reliable operation, with good over-voltage handling capability, with long life.

The present invention results in large part from a fuller understanding of the mechanism of over-voltage breakdown in relation to electrode arrangement, constituents of the solid dielectric material, and characteristics of the fluid impregnant which results in novel capacitor structures and gives the capacitor designer greater ability to make sound choices for the various elements of the system as will assure good reliable operation.

SUMMARY OF THE INVENTION

In accordance with the present invention, there are provided power capacitors with a wide electrode and a narrow electrode and a composite dielectric including a first portion or sheet adjacent the narrower electrode that is of higher dielectric constant and/or lower resistivity (preferably both) than the portion or sheet adjacent the wider electrode. The first portion may be a porous material whose impregnation with a dielectric fluid results in the desired electrical properties. In such structures the narrower electrode preferably has rounded and smooth edges such as by folding. The wide and narrow electrodes may each comprise one of the externally connected capacitor electrodes. Alternatively, the wider electrode may be electrically floating and arranged between dielectrics and a second narrower electrode in a symmetrical arrangement with the two narrower electrodes serving as the externally connected capacitor electrodes.

A wide choice of materials is available for the composite dielectric. The higher dielectric constant and/or lower resistivity layer may be one of several synthetic films as well as capacitor grade "Kraft" paper. The lower dielectric constant and/or higher resistivity layer may be one of several other film materials including but not limited to polypropylene.

The relation of dielectric constants of the first and second sheet portions is particularly significant in AC power factor capacitors. The relation of the resistivity of the sheet portions is particularly significant in DC energy storage capacitors and the like. It is readily possible in accordance with this invention to choose a combination of materials having the right characteristics for either type of application. However, the invention applies as well to combinations satisfying only one of the criteria of electrical properties.

Note, also, that while emphasis is made herein of the electrical properties of the dielectric sheet materials adjacent each of the electrodes, those materials may be immediately adjacent each other or may be in a composite with additional intervening layers of dielectric whose electrical properties are of less significance.

It is to be noted that the relation of dielectric constant and resistivity of the dielectric portions is determined in part by the characteristics of the dielectric fluid impregnant and the relative porosity of the sheet materials. In general it is desirable for the higher dielectric constant layer to be more porous than the other, as by the use of paper or a porous synthetic.

Thorough impregnation is desired in all of the disclosed capacitor structures. In those in which the narrower electrodes have rounded and smooth edges, an aid to impregnation can be obtained by using normal aluminum foil electrode material and folding each edge substantially to the center line of the foil with the surface having a mat finish disposed on the outside of the folds.

In the disclosed structures in which the wider electrode is electrically floating it may be a separate foil element or may be a metallized layer deposited on one of the adjacent dielectric sheets. Also the floating conductor may be a single continuous layer or may be of two bands each of which encompasses one of the edges of the narrower electrodes.

DESCRIPTION OF PREFERRED EMBODIMENTS

Figure 1:
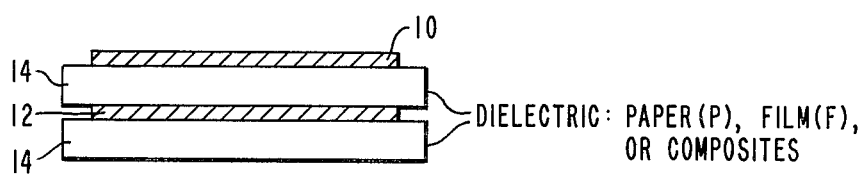
FIGS. 1, 2 and 3 are cross-sectional views of capacitor structures in accordance with the prior art.
Figure 2:
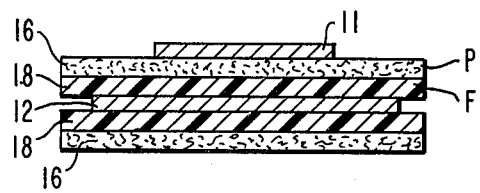
Figure 3:
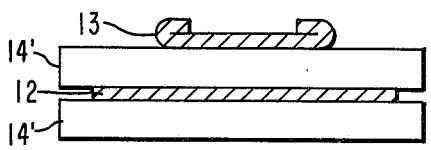

Referring to the drawing, FIGS. 1, 2, and 3 which show prior art capacitor structures will be briefly described by way of background.

In FIG. 1, a generally conventional capacitor structure is shown in which two electrode foil layers 10 and 12 are of like dimensions and spaced by a dielectric layer or layers 14 comprising either capacitor grade paper or polymeric film or composites including one or more layers of both paper and film. As well as with the other structures to be described, normal manufacturing practice is to assemble two foil electrodes with dielectric therebetween and another dielectric layer next to one of the foil electrodes as shown. Upon winding of such an assembled stack into a convolute winding each electrode has dielectric material 14 on both sides of it. Such structures, and all of those to be described, are normally and preferably impregnated with a dielectric fluid. In the past this has normally been a halogenated diphenyl. The problem with the structure in accordance with FIG. 1 is that the like dimensioned foil electrodes are impractical to align perfectly resulting in lower electrical stress capability at the edges as discussed hereinabove.

In FIG. 2, a structure shown in accordance with the referred to Yagitani Patent wherein one of the foil electrodes 11 is intentionally made narrower than the other 12 and the dielectric material includes at least a first layer of paper 16 adjacent to the narrower foil electrode 11 and a second layer of film 18, particularly polypropylene film, adjacent the wider electrode 12. As is demonstrated in the Yagitani Patent, such structures provide improved electrical stress capability compared with otherwise like structures in which the foil electrodes are of the same dimensions, but suffer inherent misalignment.

In FIG. 3 is generally illustrated the further improvement of the referred to Yagitani et al. application wherein the narrower foil electrode 13 in a wide-narrow foil electrode combination has its edges made rounded and smooth such as by folding. An example disclosed in the Yagitani et al application shows improved results for the case in which the dielectric 14' is of three layers of film.

From a better understanding of the relation of the dielectric material with the electrodes of a wide-narrow foil arrangement, there are provided in accordance with this invention improved capacitor structures.

As a general proposition, it can be shown that for a given dielectric system, offset electrodes produce a higher voltage stress than aligned electrodes and the voltage stress increases up to a limit with increasing amount of offset. A difference in foil dimensions of about 10 mils at each edge permits manufacture without extra care, e.g., a situation in which one narrow foil edge is about 8 or 9 mils in from the wide foil edge and the other narrow foil edge is 11 or 12 mils in from the other wide foil edge is satisfactory and much better than a similar variance between like dimensioned foils. The invention recognizes that fact and utilizes it to provide capacitor structures with a deliberate offset in the electrodes and control of the nature of the dielectric material adjacent the narrower electrode. Controlled voltage stress at the narrower foil edge without extreme care in assembly is therefore permitted.

Figure 4:
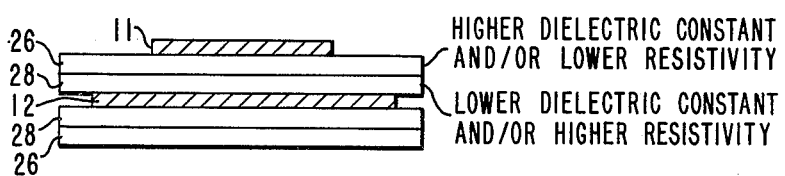
FIGS. 4, 5 and 6 are cross-sectional views of capacitor structures in accordance with embodiments of the present invention.
Figure 5:
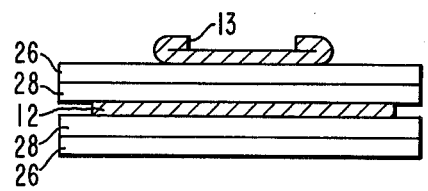

FIG. 4 shows a structure utilizing the wide-narrow foil arrangement with straight cut edges while in FIG. 5 the same structure is shown in which the narrower foil has rounded and smoother edges. In each case the dielectric is a composite of particularly chosen materials wherein a first layer 26 adjacent the narrower electrode 11 or 13 has a higher dielectric constant and preferably also lower electrical resistivity than the second layer 28 adjacent the wider electrode foil 12. This relation of electrical properties results in a situation such that when a voltage is applied between the foil electrodes, the voltage stress will be distributed across the dielectric sheet inversely in relation to their dielectric constants. With a high dielectric constant material 26 adjacent the narrow foil, the stress on this high dielectric constant material will be relatively low and consequently the stress at the narrow foil edge will also be low.

It happens to be the case that the dielectric structure presented in the Yagitani Patent (FIG. 2, above) usually satisfies this desired electrical property relationship. That is, normally a layer 16 of capacitor grade paper, impregnated with a dielectric fluid, will provide a higher dielectric constant and lower electrical resistivity than a layer 18 of polypropylene film of normal properties. What was unrecognized in the Yagitani Patent was that the improved properties of the structure therein disclosed are essentially related to the relation of electrical properties of the different parts of the composite dielectric. Now with the understanding of the importance of this relation of electrical properties, it is made possible to provide structures of composite dielectrics other than paper and polypropylene that gives the improved performance in the wide-narrow foil electrode arrangement. For example, the following Table presents examples of combinations of dielectric materials that may be used together and include combinations in which the polypropylene film is adjacent to wide foil electrodes and dielectrics of material other than capacitor grade paper are employed next to the narrowest foil used adjacent the wide foil 12 and more porous dielectric sheet 26 material be used adjacent the narrow foil 11 or 13 and a relatively high dielectric constant fluid be used for impregnation which increases the dielectric constant of sheet 26 and thereby decreases the voltage stress on the sheet 26 at the narrow foil edges. Examples of suitable porous dielectric sheet materials (for layer 26) are:

Kraft paper;
Synthetic papers of polymer fibers such as polypropylene;
Synthetic papers made porous or cellulose by stretching polymer films filled with inorganic powders such as calcium carbonate.

| TABLE OF EXAMPLE DIELECTRIC MATERIALS | | | |
|---|---|---|---|
| Layer 26 Adj. Narrower Electrode | Diel. Const. | Layer 28 Adj. Wider Electrode | Diel. Const. |
| Polyester film | 3.2 | with Polypropylene film | 2.2 |
| Polyphenylene oxide film | 2.6 | with Polypropylene film | 2.2 |
| Cyanoethyl cellulose | 18.0 | with Polypropylene film | 2.2 |
| Capacitor grade Kraft paper | 6.2 | with Polyethylene film | 2.2 |
| Capacitor grade Kraft paper | 6.2 | with Polycarbonate film | 3.1 |
| Capacitor grade Kraft paper | 6.2 | with Polyamide film | 4.6 |
| Capacitor grade Kraft paper | 6.2 | with Polyimide film | 4.5 | electrode. Also in combinations wherein capacitor grade paper is the dielectric next to the narrower foil, materials other than polypropylene are employed adjacent to the wider foil. When impregnated all these structures provide good electrical stress capability.

Examples of capacitor tests illustrating the improvement gained by employing the higher dielectric constant material adjacent the narrower electrode is shown and compared to the opposite situation where the higher dielectric constant material is adjacent the wider foil electrode. Examples 1 and 2 were impregnated with mineral oil and Examples 3 and 4 were impregnated with polychlorinated biphenyl.

Examples 1 and 3 are examples of the preferred construction with the higher dielectric constant material situated adjacent the narrow electrode and show an improvement of approximately 15–30% in breakdown Examples of suitable materials which are available as non-porous dielectric sheets (for layer 28) are:

| | Dielectric Constant |
|---|---|
| Polyester film | 3.2 |
| Polyphenylene oxide | 2.6 |
| Polypropylene | 2.2 |
| Polystyrene | 2.5 |
| Polyethylene | 2.2 |
| Polycarbonate | 3.1 |

The dielectric constant of the porous sheet can be increased by impregnation with a high dielectric constant (at least about 5) fluid such as:

| | Dielectric Constant |
|---|---|
| Polychlorinated biphenyl | 5.8 |
| Tolyl xylyl sulfone | 20. |
| Diethyl hexyl pthalate | 5.2 |

| Example No. | Adjacent Narrow Electrode | Adjacent Wide Electrode | AC Test Voltage | Results |
|---|---|---|---|---|
| 1 | 0.7 mil polyester | 1.0 mil polypropylene | 4750 | Visible corona discharge. |
| | | | 5750 | Failed. |
| 2 | 1.0 mil polypropylene | 0.7 mil polyester | 4000 | Visible corona discharge. |
| | | | 5000 | Failed. |
| 3 | 3 sheets 0.9 mil Kraft paper | 0.7 mil polyethylene | 7000 | No visible corona discharge. |
| | | | 7500 | Failed. |
| 4 | 0.7 mil polyethylene | 3 sheets 0.9 mil Kraft paper | 5250 | No visible corona discharge. |
| | | | 5500 | Failed. | voltage, thus demonstrating significantly improved voltage stress handling capability.

The relative porosity of the different layers 26 and 28 of the dielectric and the relative dielectric constants of the dielectric fluid used for impregnation in relation to the dielectric constant of the sheet materials can also be of significance. Thus, as a general proposition, it is preferred that a rather non-porous dielectric sheet 28 be The foregoing discussion of the relation of dielectric constant and electrical resistivity of the layers is significant in capacitors for both AC and DC application. It is, however, the case that for AC applications it is the dielectric constant relationship that is most important while for DC application it is the electrical resistivity relationship that is most important. The examples given above are primarily with reference to the relation of dielectric constants so as to make good AC capacitors. For DC applications where relative resistivity is more important the following are examples of suitable materials that may be employed. Examples of high resistivity (about $10^{17}$ to $10^{19}$ ohm cm.) sheet materials:

Polyester film;
Polyphenylene oxide film;
Polycarbonate film; and
Polyolefin (e.g., polypropylene or polyethylene) film.

Examples of low resistivity (about $10^{10}$ to $10^{14}$ ohm cm.) sheet materials:

Kraft or synthetic paper impregnated with low resistivity fluids such as:
  mineral oil;
  diethyl hexyl pthalate;
  isopropylated diphenyl; or,
  alkylated napthalene
with, preferably, fluid additives such as
  tin tetraphenyl;
  cadmium carboxylate;
  beta methyl anthraquinone; or,
  an expoxide,
which additives further lower the fluid resistivity.

The structure of FIG. 5 employing the rounded and smooth edged narrow foil electrode offers advantages over that of FIG. 4, as result from the teachings of the Yagitani et al. pending application. It is to be recognized that in instances in which the smooth edges are provided by folding it is not critical in which direction the fold is made or which surface of the foil is outside the fold. Normal aluminum foil available for use in capacitors inherently has a shiny or polished surface and a dull or mat finished surface of some difference in roughness. It is found that if the mat finish surface is on the outside of the fold, there is some improvement over the case in which the shiny surface is outside the fold. However, in general the rounding and smoothing of the edges of the narrower foil may be accomplished in various ways other than folding. For example, assuming straight cut foils as shown in FIG. 4, the narrower one may have its edges treated by coating, flame treatments, chemical treatments, and electrical treatments such as to cause partial discharges from sharp points to cause the points to burn away. It is also an advantage to employ thick foil materials. This is not essential but better success is obtained if a relatively thick foil made of 0.001 inch material is used as the narrower and rounded edge foil as compared with a 0.00025 inch thick foil.

Figure 6:
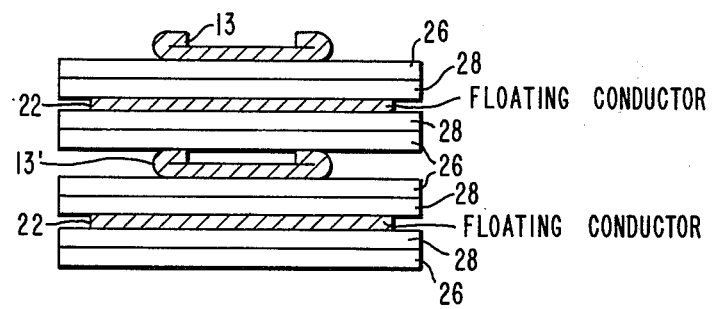

A further form of improved structure is that shown in FIG. 6. For reference it is to be understood that in the structures of FIGS. 1 through 5 the two electrodes shown are those ultimately connected in some suitable fashion to the exterior of the capacitor. In the structure of FIG. 6 there are two narrow foils 13 and 13′, preferably with rounded edges, between which there are two groups of capacitor dielectric layers, preferably as discussed in connection with FIGS. 4 and 5, wherein between each of the two groups there is a wider electrode foil 22. The wider foil 22 in this combination is intended as a floating conductor that is not connected externally to any voltage. Its voltage will be determined by the voltage distribution within the dielectric system. The floating conductor 22 reduces the thickness between the actual electrodes 13 and 13′ and the floating conductor 22 to one-half of the total thickness between electrodes 13 and 13′. The ratio between edge stress and body stress decreases as the thickness between electrodes decreases. Therefore, the over-voltage capability per unit increases with the use of the floating conductor 22. It is in accordance with this invention that the floating conductor 22 is made wider than the two actual electrodes 13 and 13′ and that those two electrodes 13 and 13′ preferably have rounded edges and that the dielectric between the floating conductor and the electrode is a composite of layers chosen for electrical properties as previously described.

Figure 7:
FIG. 7 is a cross-sectional view of a capacitor electrode suitable for use in embodiments of the present invention.

A further refinement is shown in FIG. 7, which is a round edged foil electrode 23 that may be used as the narrow electrode in any of the previous structures. In accordance with FIG. 7, the rounded edges are provided by folding the foil over its entire extent so that the cut edges of the foil are substantially together at 30. Also, assuming normal aluminum foils with a polished and a mat surface, in FIG. 7 the mat surface is on the exterior of the folded structure. Therefore, as to each of the adjacent dielectric materials the electrode 23 presents its more rough surface with the ability to further enhance impregnation of the adjacent dielectric with a dielectric fluid.

Figure 8:
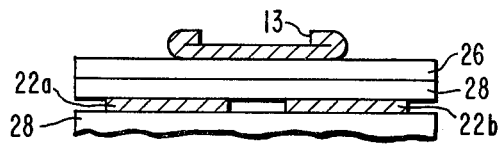
FIG. 8 is a partial sectional view of a further embodiment.

FIG. 8 shows, in a partial view a further refinement generally consistent with FIG. 6 wherein the floating conductor comprises a pair of separate conductive bands 22a and 22b each located to encompass the edge portion of the capacitor electrode 13, the latter being substantially aligned with the other electrode 13′. In both FIGS. 6 and 8 the floating conductor may be a separate foil layer 22 or layers 22a and 22b or it may be formed by deposition of metallic material directly on one of the dielectric sheets, that is a metallized layer or layers. Particularly where metallization is used, the structure of FIG. 8 provides the desired benefits with economy of material.

Among the choices of dielectric materials that may be used in the structures of FIGS. 4 through 8 are film materials with rough surfaces or otherwise made absorbent and suitable as wicking materials. These materials include biaxially oriented films of polypropolyene, polyethylene or films of polyester, polycarbonate, polyamide or other plastic films. Any of these films may have one side with an altered or hazy surface or it may be formed by coextrusion with a thin film of a copolymer which is embossed to provide a rough surface on one side of the base film, or such a film base may have applied to one surface an adherent layer of polypropolyene or other composition fibers to act as a wicking layer, or a film layer may be used having a filler material and made by stretch processing to provide a paperlike internal cellular absorptive structure, which may be referred to as "synthetic paper."

A thorough impregnation of all voids in the dielectric layers of the capacitor is necessary for use in alternating current or energy storage type capacitors at high voltage stresses. This can be achieved using any of the above-mentioned materials by utilizing one of such materials as a single layer film layer in conjunction with one or more standard capacitor grade films having lower cost and higher electrical stress capability by itself. Since some degradation of electrical stress capability is likely in the case of such modified films compared to unmodified films, it becomes even more important that the dielectric fluid impregnant be well chosen, consistent with its dielectric constant and resistivity, and include an additive such as an epoxide or beta methyl anthraquinone for longer life at high stresses.

The invention offers designers a wider selection of capacitor structures with composite dielectric materials than has been previously available. While it can be expected that prior known structures where the dielectric sheets are of the same material (for example, all paper or all film) or at least the same material adjacent the two electrodes (for example, a film-paper-film composite), and with like dimensioned or wide-narrow foil electrodes, will continue to find application, new options are now made available for a considered choice of materials, electrodes and their arrangement.

I claim:

1. A capacitor structure, particularly suitable for use in power capacitors having high electric stress capability, comprising:
   a dielectric structure of sheet material including first and second layered portions, said sheet material being impregnated with a dielectric fluid;
   a first electrode layer adjacent said first portion of said dielectric structure;
   a second electrode layer adjacent said second portion of said dielectric structure, said second electrode layer having a greater width than said first electrode layer and being located to extend on said dielectric structure beyond opposite edges of said first electrode layer;
   said first portion of said dielectric structure, as impregnated, having a higher dielectric constant or a lower electrical resistivity than said second portion;
   said first portion of said dielectric structure comprising a material selected from the group consisting essentially of polyester film, polyphenylene oxide film and cyanoethyl cellulose film.

2. A capacitor structure in accordance with claim 1 wherein:
   said dielectric fluid has a dielectric constant of at least about 5.

3. A capacitor structure in accordance with claim 2 wherein:
   said dielectric fluid comprises at least one member of the group consisting of polychlorinated biphenyl, tolyl xylyl sulfone, and diethyl hexyl pthalate.

4. A capacitor structure in accordance with claim 1 wherein:
   said second portion of said dielectric structure comprises a material selected from the group consisting essentially of polyethylene film, polycarbonate film, polyamide film, and polyimide film.

5. A capacitor structure in accordance with claim 1 wherein:
   said opposite edges of said first electrode layer are rounded and smooth.

6. A capacitor structure, particularly suitable for use in power capacitors having high electric stress capability, comprising:
   a dielectric structure of sheet material including first and second layered portions, said sheet material being impregnated with a dielectric fluid;
   a first electrode layer adjacent said first portion of said dielectric structure;
   a second electrode layer adjacent said second portion of said dielectric structure, said second electrode layer having a greater width than said first electrode layer and being located to extend on said dielectric structure beyond opposite edges of said first electrode layer;
   said first portion of said dielectric structure, as impregnated, having a higher dielectric constant or a lower electrical resistivity than said second portion;
   said first and second portions of said dielectric structure being selected from any of the following:

| First dielectric portion adjacent said first electrode layer | Second dielectric portion adjacent said second, greater width, electrode layer |
| --- | --- |
| (a) polyester film with | either polypropylene film, polyethylene film, or polycarbonate film; |
| (b) polyphenylene oxide film with | either polypropylene film, or polyethylene film, |
| (c) cyanoethyl cellulose with | either polypropylene film, polyethylene film, polycarbonate film, polyamide film, or polyimide film; |
| (d) either polyester film, polyphenylene oxide film, polycarbonate film, or polyolefin film with | either Kraft or synthetic paper impregnated with a low resistivity fluid selected from the group consisting of mineral oil, diethyl hexyl pthalate, isopropylated diphenyl, and alkylated napthalene. |

7. The subject matter of claim 6 wherein: said first electrode layer has a fold at each of its lateral extremes to form edges that are rounded and smooth.

8. The subject matter of claim 6 wherein: said dielectric structure is selected from those set forth under part (d) and said fluid contains an additive selected from the group consisting of tin tetraphenyl, cadmium carboxylate, beta methyl anthraquinone, and epoxies.

9. A capacitor structure in accordance with claim 7 wherein: said first electrode layer comprises aluminum foil material whose cut edges are folded over substantially to the centerline of the foil and whose surface on the exterior of the folded electrode has a mat finish.

10. A capacitor structure in accordance with claim 6, wherein: a second dielectric structure is disposed between said second electrode layer and a third electrode layer on the opposite surface of said second dielectric structure;
   said second electrode layer also has a greater width than said third electrode layer and is located to extend on said dielectric structure beyond opposite edges of said third electrode layer;
   said second dielectric structure also has first and second layered portions which, as impregnated, include a first portion adjacent said third electrode layer of higher dielectric constant or lower electrical resistivity than a second portion adjacent said third electrode layer; and,
   said second electrode layer is maintained at a floating potential unconnected to any voltage while said first and third electrode layers serve as capacitor electrodes connected exteriorly of the capacitor.

11. A capacitor structure in accordance with claim 10 wherein: said second electrode layer comprises a pair of separate conductive bands located to encompass edge portions of said first and third electrode layers.

* * * * *